(12) United States Patent
Hasan et al.

(10) Patent No.: US 10,373,739 B2
(45) Date of Patent: *Aug. 6, 2019

(54) CARBON NANOTUBE SHIELDING FOR TRANSMISSION CABLES

(71) Applicant: The Boeing Company, Chicago, IL (US)

(72) Inventors: Zeaid F. Hasan, Charleston, SC (US);
Jade M. Brown, Charleston, SC (US);
Daniel J. Braley, St. Peters, MO (US);
Jacob Battat, St. Louis, MO (US);
John H. Belk, St. Louis, MO (US);
Joseph B. Harriman, Summerville, SC (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/950,485

(22) Filed: Apr. 11, 2018

(65) Prior Publication Data

US 2018/0233253 A1    Aug. 16, 2018

Related U.S. Application Data

(63) Continuation of application No. 14/962,249, filed on Dec. 8, 2015, now Pat. No. 9,972,420.

(51) Int. Cl.
| | | |
|---|---|---|
| *H01B 11/06* | (2006.01) | |
| *H01B 9/02* | (2006.01) | |
| *H01B 1/24* | (2006.01) | |
| *H01B 11/18* | (2006.01) | |
| *C01B 32/158* | (2017.01) | |
| *B82Y 30/00* | (2011.01) | |
| *H01B 13/26* | (2006.01) | |

(52) U.S. Cl.
CPC ......... *H01B 9/023* (2013.01); *C01B 32/158* (2017.08); *H01B 1/24* (2013.01); *H01B 11/183* (2013.01); *B82Y 30/00* (2013.01); *H01B 13/26* (2013.01)

(58) Field of Classification Search
CPC ..................................... H01B 11/06
USPC ........................ 174/36, 106 R, 108
See application file for complete search history.

(56) References Cited

U.S. PATENT DOCUMENTS

| | | | | |
|---|---|---|---|---|
| 4,828,775 A | * | 5/1989 | Willenberg ............. | B29C 67/24 264/103 |
| 5,254,188 A | * | 10/1993 | Blew .................... | H01B 13/225 156/53 |
| 7,354,887 B2 | * | 4/2008 | Bloom ........................ | C08J 5/04 252/299.01 |
| 7,491,883 B2 | * | 2/2009 | Lee .................... | H01B 11/1808 174/28 |
| 8,749,009 B2 | * | 6/2014 | Young ................. | H01L 31/0481 257/439 |
| 9,540,498 B1 | * | 1/2017 | Scheffer ............... | C08K 5/1535 |
| 2010/0000754 A1 | * | 1/2010 | Mann ...................... | H01B 1/04 174/34 |
| 2011/0049292 A1 | * | 3/2011 | Kruckenberg ......... | B64D 45/02 244/1 A |

(Continued)

*Primary Examiner* — Chau N Nguyen
(74) *Attorney, Agent, or Firm* — Walters & Wasylyna LLC

(57) ABSTRACT

A transmission cable may include a conductor core, an insulator layer surrounding the conductor core, and a shielding layer surrounding the insulator layer, wherein the shielding layer includes a carbon nanotube sheet material.

20 Claims, 8 Drawing Sheets

(56) References Cited

U.S. PATENT DOCUMENTS

| | | | |
|---|---|---|---|
| 2013/0233595 A1* | 9/2013 | Cooper | H01B 5/002 174/126.2 |
| 2014/0011414 A1* | 1/2014 | Kruckenberg | B32B 5/16 442/181 |
| 2014/0151111 A1* | 6/2014 | Shah | H05K 9/009 174/388 |

* cited by examiner

CARBON NANOTUBE SHIELDING FOR TRANSMISSION CABLES

PRIORITY

This application is a continuation of U.S. Ser. No. 14/962,249 filed on Dec. 8, 2015.

FIELD

The present disclosure is generally related to transmission cables and, more particularly, to a transmission cable using a carbon nanotube sheet material as a shielding layer and method for making the same.

BACKGROUND

Transmission cables are used to transfer electrical power and/or data signals. Typically, a transmission cable includes a conductor core and an insulating jacket surrounding the conductor core. The conductor core requires good electrical conductivity in order to transmit electrical power or data signals. The insulating jacket protects the conductor core and fulfills other mechanical and electrical properties.

In certain applications, the cable may be exposed to various types of electromagnetic interference. As one example, transmission cables used on aircraft are frequently exposed to High-Intensity Radiated Fields ("HIRF") that emanate from high-powered radio and/or television frequency transmitters, radar, satellite transmitters, large microwave communication systems and the like. As a result, various onboard systems of the aircraft may be affected by the electromagnetic fields generated by HIRF.

Accordingly, some transmission cables also include a shielding jacket (e.g., copper, silver or aluminum shielding) surrounding the insulating jacket to protect the cable from such electromagnetic interference. Disadvantageously, such shielding increases the weight of the cables and, thus, the overall weight of the aircraft, may be susceptible to environmental effects (e.g., corrosion), may generate heat in response to the electromagnetic interference, and/or may suffer from signal decay due to the electromagnetic interference.

Accordingly, those skilled in the art continue with research and development efforts in the field of transmission cables that are resistant to electromagnetic interference, particularly, in the aerospace industry.

SUMMARY

In one example, the disclosed cable may include a conductor core, an insulator layer surrounding the conductor core, and a shielding layer surrounding the insulator layer, wherein the shielding layer includes a carbon nanotube sheet material.

In another example, the disclosed cable may include a conductor core, wherein the conductor core includes a carbon nanotube sheet material, an insulator layer surrounding the conductor core, and a shielding layer surrounding the insulator layer, wherein the shielding layer includes the carbon nanotube sheet material.

In yet another example, the disclosed method for making a cable may include the steps of: (1) placing an insulator layer to surround a conductor core, and (2) placing a shielding layer to surround the insulator layer, wherein the shielding layer includes a carbon nanotube sheet material, and wherein the carbon nanotube sheet material includes carbon nanotubes entangled together to form a network.

Other examples of the disclosed apparatus and methods will become apparent from the following detailed description, the accompanying drawings and the appended claims.

DETAILED DESCRIPTION

Figure 1:
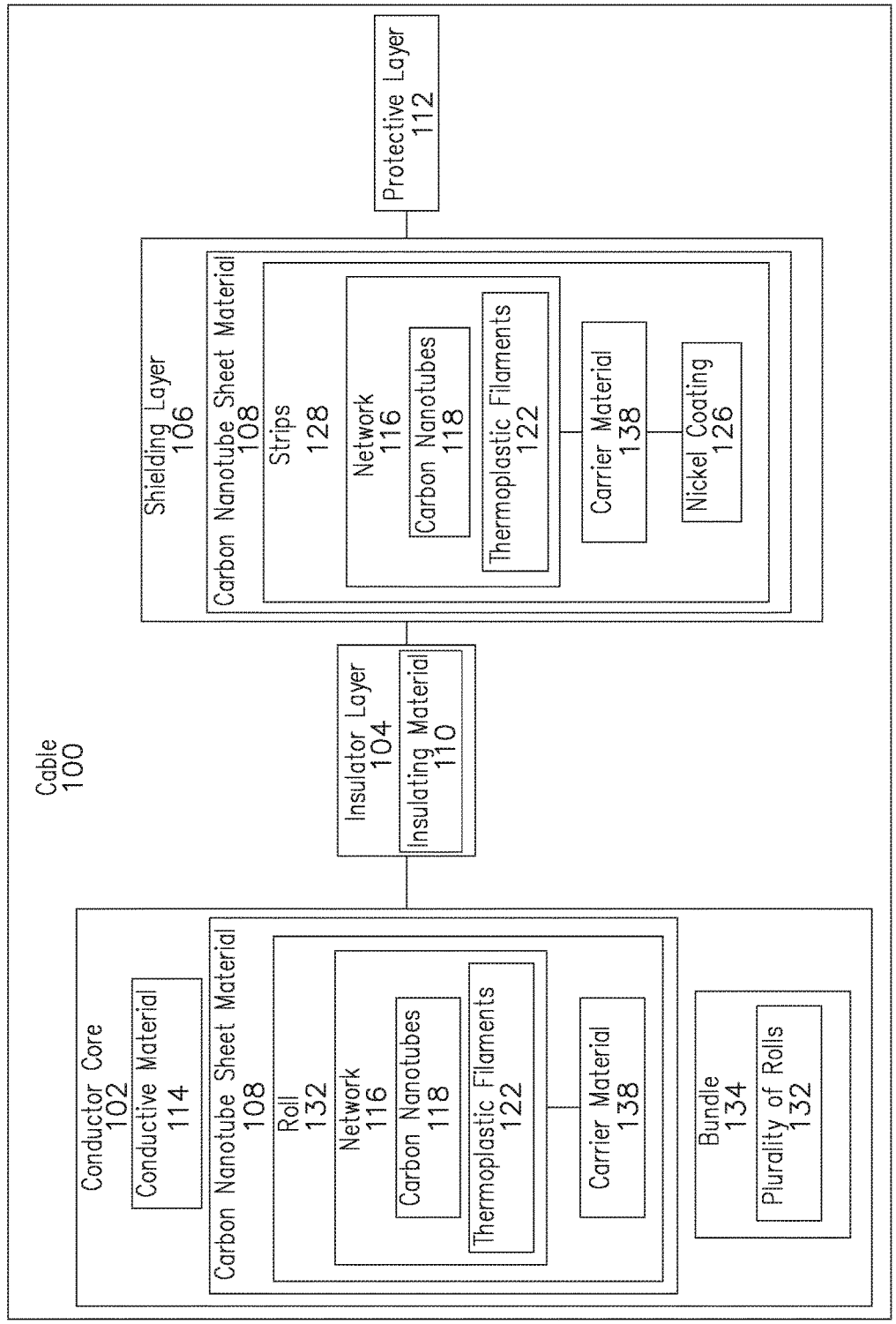
FIG. 1 is a schematic block diagram of one example of the disclosed cable.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 15:
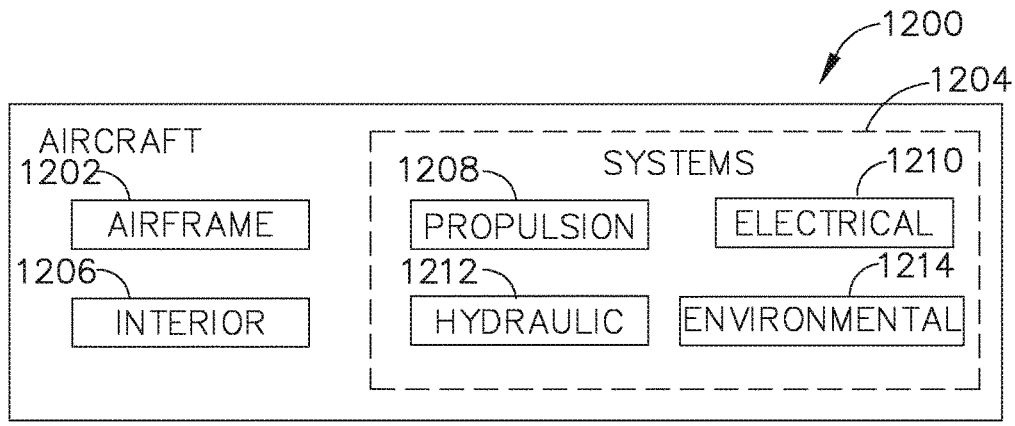
FIG. 15 is a schematic illustration of an aircraft.

In FIGS. 1 and 15, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1 and 15 may be combined in various ways without the need to include other features described in FIGS. 1 and 15, other drawing figures, and/or the accompanying disclosure, even though such combination or combinations are not explicitly illustrated herein. Similarly, additional features not limited to the examples presented, may be combined with some or all of the features shown and described herein.

Figure 13:
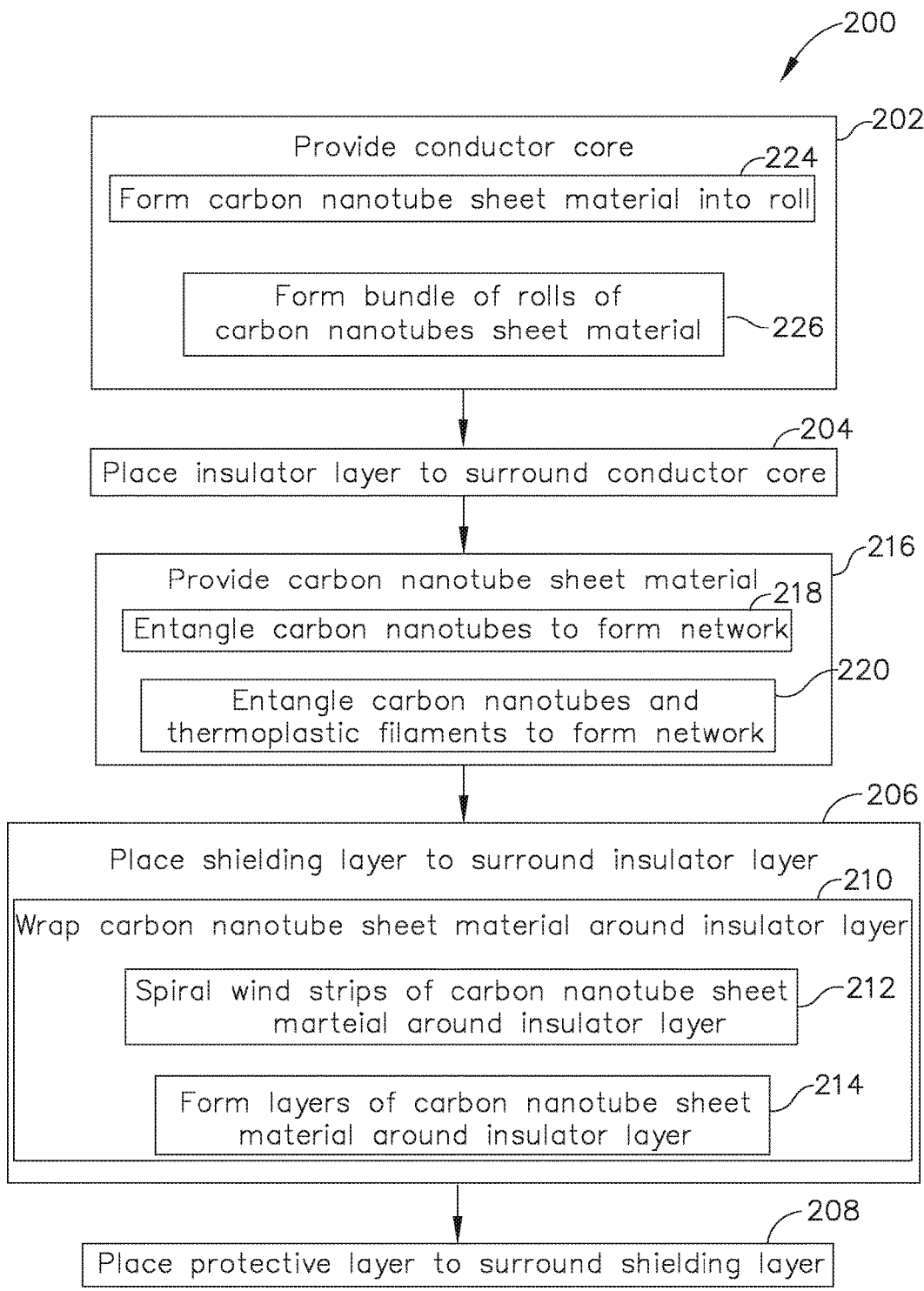
FIG. 13 is a flow diagram of one example of the disclosed method for making the cable of FIG. 1.
Figure 14:
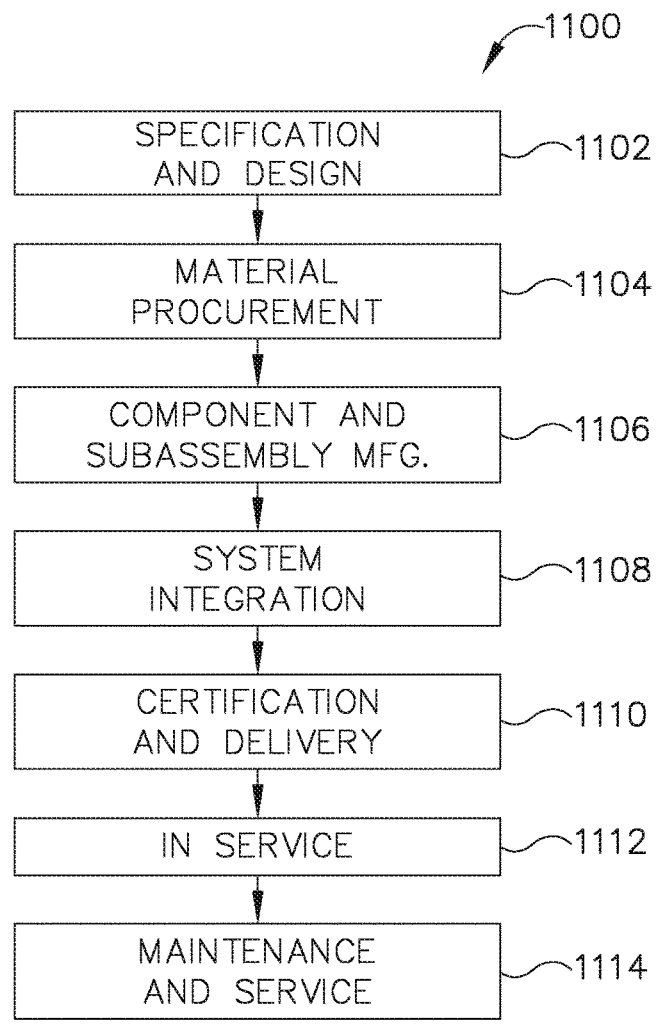
FIG. 14 is a block diagram of aircraft production and service methodology.

In FIGS. 13 and 14, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 13 and 14 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

Reference herein to "example" means that one or more feature, structure, or characteristic described in connection with the example is included in at least one embodiment or implementation. The phrase "one example" or "another example" in various places in the specification may or may not be referring to the same example.

Referring to FIG. 1, one example of transmission (e.g., coaxial) cable, generally designated cable 100, is disclosed. As one example, cable 100 includes conductor core 102, insulator layer 104, and shielding layer 106. As one non-limiting example, cable 100 is an electrical transmission cable capable of transferring electrical power, for example, direct current ("DC") power. As one non-limiting example, cable 100 is a data transmission cable capable of transferring data signals, for example, for communication and/or control applications.

Figure 2:
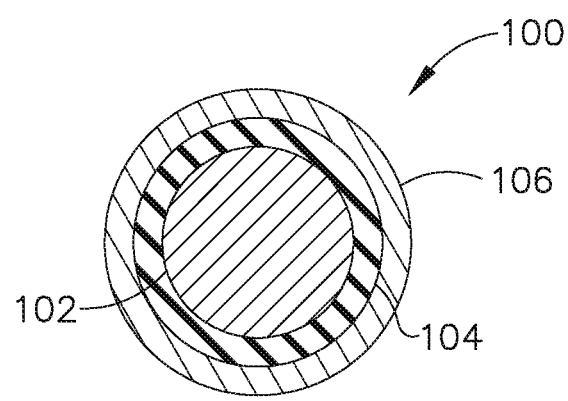
FIG. 2 is a schematic, cross-sectional view of one example of the cable of FIG. 1.
Figure 3:
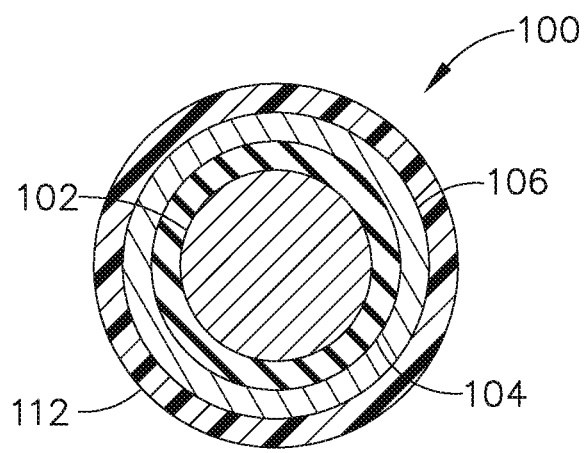
FIG. 3 is a schematic, cross-sectional view of one example of the cable of FIG. 1.
Figure 4:
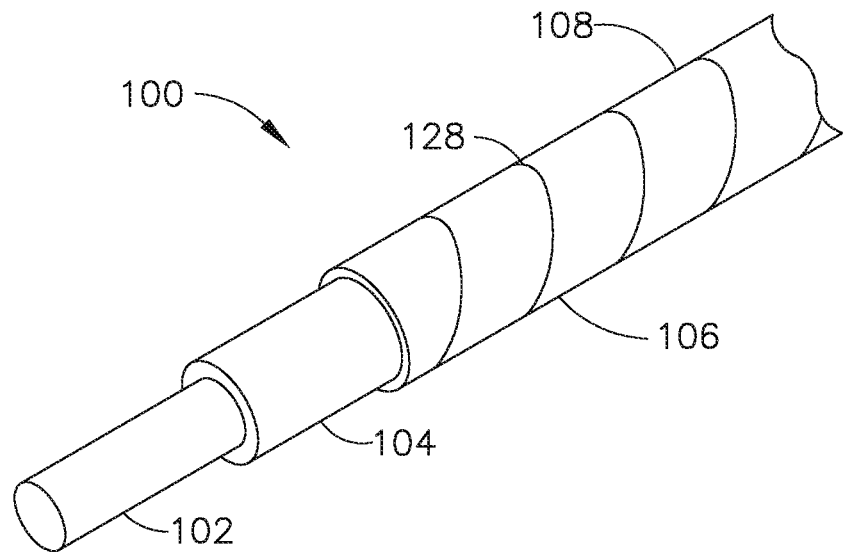
FIG. 4 is a schematic, cutaway view of one example of the cable of FIG. 1.

Referring to FIGS. 2-4, and with reference to FIG. 1, conductor core 102 forms an interior of cable 100. Insulator layer 104 surrounds conductor core 102 (e.g., coaxially covers or encloses conductor core 102). Shielding layer 106 surrounds insulator layer 104 (e.g., coaxially covers or encloses insulator layer 104 and conductor core 102).

As one example, and as best illustrated in FIGS. 2 and 3, cable 100 may include one shielding layer 106 (e.g., being formed by one or more layers of carbon nanotube sheet material 108) (FIG. 1). As one example (not explicitly illustrated), cable 100 may include more than one shielding layer 106 (e.g., each one of shielding layers 106 being formed by one or more layers of carbon nanotube sheet material 108). The number of shielding layers 106 (or the number of layers of carbon nanotube sheet material 108) may depend on various factors including, but not limited to, the desired shielding performance.

Shielding layer 106 (e.g., one or more layers of carbon nanotube sheet material 108) may be wrapped or wound around insulator layer 104. As one example, shielding layer 106 may be manually wrapped around insulator layer 104. As one example, shielding layer 106 may be wrapped around insulator layer 104 using an automation process. A tensile force applied during the wrapping process may hold shielding layer 106 in place relative to insulator layer 104. Thus, no bonding material or agent may be necessary at an interface of insulator layer 104 and shielding layer 106 (e.g., between insulating material 110 and carbon nanotube sheet material 108).

Both ends of shielding layer 106 may be grounded for HIRF protection. Connectors (not explicitly illustrated) may be connected to ends of cable 100, for example, by crimping or soldering. The connectors may secure conductor core 102, insulator layer 104 and shielding layer 106 (and protective layer 112) together.

Referring to FIGS. 2 and 4, and with reference to FIG. 1, conductor core 102 may include any suitable conductive material 114. As one non-limiting example, conductor core 102 (e.g., conductive material 114) includes one or more flexible, conductive wires (e.g., a single conductive wire or multiple conductive wires). As one example, the wire may be a metal wire (e.g., a copper wire, a copper wire coated with silver, a nickel wire coated with copper and the like), an alloy and any combination thereof. The wire may be a solid wire (e.g., a solid-core or single-strand wire), a braided wire (e.g., a number of strands of wire braided together), a stranded wire (e.g., a number of strands of wire bundled or wrapped together) and the like.

Referring to FIG. 1, and with reference to FIGS. 2 and 4, insulator layer 104 may include any suitable insulative material 110. Insulative material 110 may be an electric insulator or dielectric. As non-limiting examples, insulator layer 104 (e.g., insulator material 110) may include at least one of nanoclay, polytetrafluoroethylene ("PTFE") (e.g., Teflon), a polymer (e.g., polyethylene, polypropylene, polyimide, polyethylene propylene co-polymer, ethylene tetrafluoroethylene, fluorinated ethylene propylene, polytetrafluoroethylene/perfluoromethylvinylether co-polymer, perfluoroalkoxy polymerand and the like) and any combination thereof. Insulator layer 104 electrically insulates conductor core 102 and separates (e.g., electrically isolates) conductor core 102 and shielding layer 106. Insulator layer 104 is disposed between conductor core 102 and shielding layer 106, as illustrated in FIGS. 2 and 4.

Referring to FIG. 3, and with reference to FIG. 1, as one example, cable 100 may also include protective layer 112 (e.g., an outer jacket). Protective layer 112 may surround shielding layer 106 (e.g., coaxially covers or encloses conductor core 102, insulator layer 104 and shielding layer 106). Shielding layer 106 may be disposed between insulator layer 104 and protective layer 112, as illustrated in FIG. 3. Protective layer 112 may protect cable 100 (e.g., shielding layer 106, insulator layer 104 and conductor core 102) from external effects (e.g., environmental effects, physical damage, etc.) Protective layer 112 may include any suitable material capable of protecting cable 100 from external effects. As non-limiting examples, protective layer 112 may include at least one of nanoclay, PTFE, a polymer and any combination thereof.

Referring to FIG. 1, and with reference to FIGS. 2-4, as one example, shielding layer 106 includes carbon nanotube sheet material 108. Carbon nanotube sheet material 108 may serve as an effective shield against electromagnetic interference at high frequencies. High frequencies include frequencies equal to or greater than 1 GHz. Carbon nanotube sheet material 108 may serve as an effective shield against electromagnetic interference at intermediate frequencies. Intermediate frequencies include frequencies between 100 MHz and 1 GHz.

As one particular, non-limiting example, shielding layer 106 protects cable 100 from electromagnetic interference and/or radio frequency interference, such as interference from electromagnetic fields generated by High-Intensity Radiated Fields ("HIRF"). In other words, shielding layer 106 may be configured to prevent any emission of cable 100 from radiating beyond a shielding boundary (e.g., defined by shielding layer 106) and limit other signals (e.g., electromagnetic interference) from penetrating inside cable 100. That is, shielding layer 106 may serve as a two-way shield.

Shielding layer 106 may also serve as a secondary conductor or ground wire.

One advantage offered by using carbon nanotube sheet material 108 as shielding layer 106, for example, as compared to only a braided metal shielding as a shielding layer, is that carbon nanotube sheet material 108 provides improved shielding effectiveness, for example, at higher frequencies. Another advantage offered by using carbon nanotube sheet material 108 as shielding layer 106 is that carbon nanotube sheet material 108 provides for a lower overall weight of cable 100. Another advantage offered by using carbon nanotube sheet material 108 as shielding layer 106 is that carbon nanotube sheet material 108 provides additional or enhanced flexibility to cable 100. Yet another advantage offered by using carbon nanotube sheet material 108 as shielding layer 106 is that carbon nanotube sheet material 108 provides improved corrosion resistance to cable 100.

Relating particularly to the enhanced flexibility of cable 100 offered by use of carbon nanotube sheet material 108 as shielding layer 106 (e.g., compared to braided copper wire), generally, when a traditional cable (e.g., data transmission or power transmission cable) with braided copper shielding is bent, there may be gaps or shielding breakages formed in the braided copper shielding that may cause a reduction in shield performance. In order to enhance shield performance, a cable may include two or more layers of braided copper shielding. This type of design may have reduced flexibility. Shielding layer 106 formed from carbon nanotube sheet material 108 may offer improved flexibility such that cable 100 can bend in larger angles while reducing and/or eliminating the creation of gaps or breakages.

Figure 5:
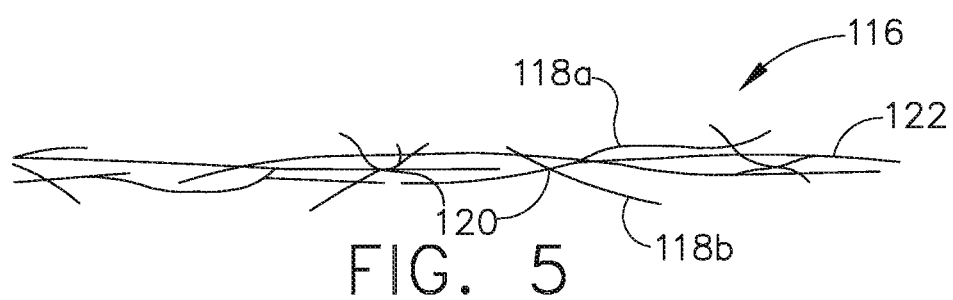
FIG. 5 is schematic side elevational illustration of one example of the disclosed network of carbon nanotubes forming the carbon nanotube sheet material of FIG. 1.
Figure 6:
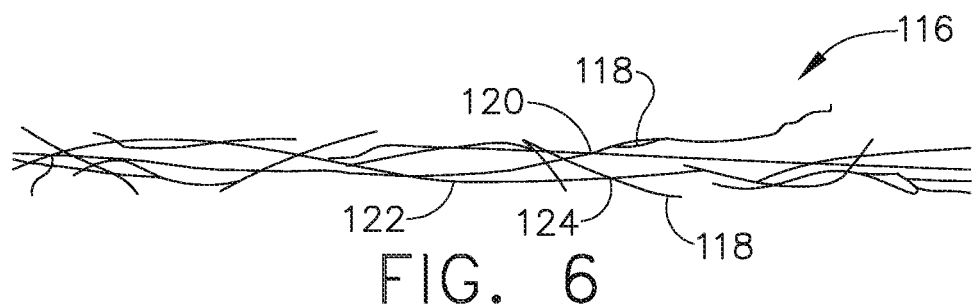
FIG. 6 is a schematic side elevational illustration of one example of the disclosed network of carbon nanotubes and thermoplastic filaments forming the carbon nanotube sheet material of FIG. 1.
Figure 7:
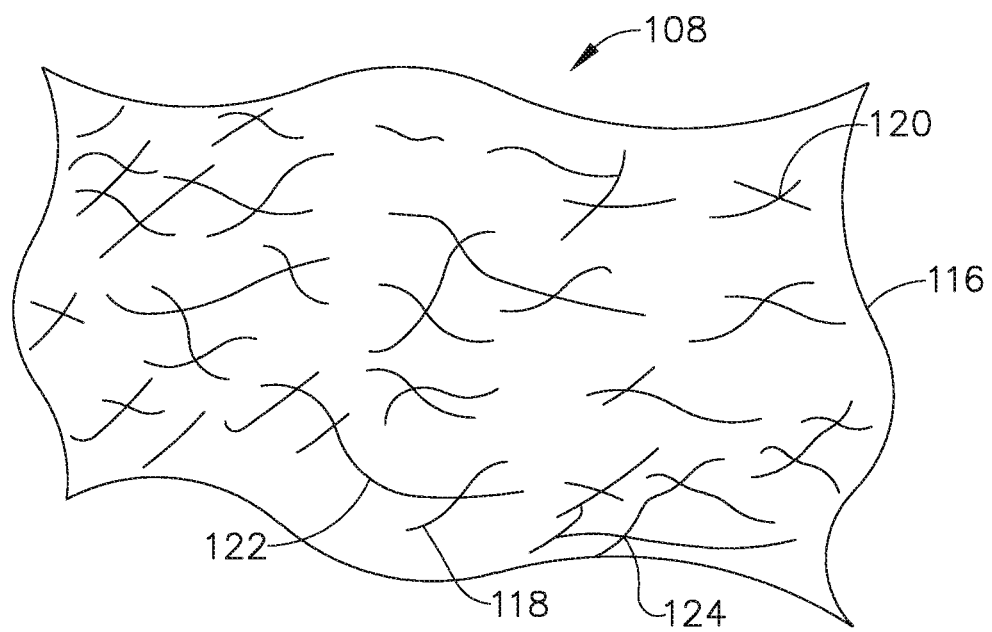
FIG. 7 is a schematic, partial top plan illustration of one example of the disclosed network of carbon nanotubes and thermoplastic filaments forming the carbon nanotube sheet material of FIG. 1.

Referring to FIG. 1, and with reference to FIGS. 5-7, as one example, carbon nanotube sheet material 108 includes carbon nanotubes 118 (e.g., a plurality of carbon nanotubes). Carbon nanotubes 118 forming carbon nanotube sheet material 108 may be discontinuous. Carbon nanotubes 118 may have an extremely high aspect ratio (e.g., length to diameter ratio). As one example, carbon nanotubes 118 may have a diameter ranging from approximately 1 nanometer to approximately 50 nanometers. As one example, carbon nanotubes 118 may have a length ranging from approximately 0.5 millimeters to approximately 4 millimeters. As one example, carbon nanotubes 118 may have a length ranging from approximately 0.5 millimeters to approximately 1 millimeter. As one example, carbon nanotubes 118 may have a length ranging from approximately 1 millimeter to approximately 4 millimeters. Other suitable diameters and/or lengths of carbon nanotubes 118 are also contemplated.

Various types of carbon nanotubes 118, for example, manufactured in accordance with known techniques, may be used to form carbon nanotube sheet material 108 (e.g., network 116 of carbon nanotubes 118). As examples, carbon nanotubes 118 may be single wall carbon nanotubes ("SW-CNT"), multiwall carbon nanotubes ("MWCNT"), prestressed multiwall carbon nanotubes ("PSMWCNT"), or a combination thereof. PSMWCNTs may be made in accordance with known techniques. As one example, PSMW-CNTs may be achieved by putting MWCNTs into a bomb chamber and using an explosion to rapidly increase the pressure to force the walls of the MWCNT to compress to within a distance where van der Waals forces dominate. As one example, PSMWCNTs may be achieved by exposing MWCNTs to radiation to increase pressure. In one particular, non-limiting example, PSMWNTs may have an interwall spacing ranging from approximately 0.22 nm to approximately 0.28 nm (e.g., compared to approximately 0.34 nm for conventional MWCNTs). Benefits offered by PSMWNTs may include enhanced interwall shear strengths, which in turn improve load-transfer capabilities compared to those of normal MWNTs. This provides axial tensile strength and Young's modulus that are approximately 20 percent higher than those of normal carbon nanotubes ("CNT").

Referring to FIGS. 5 and 7, and with reference to FIG. 1, as one example, carbon nanotubes 118 are entangled together to form network 116 (e.g., network 116 includes or is formed of entangled carbon nanotubes 118) forming carbon nanotube sheet material 108. Entanglement between carbon nanotubes 118 occurs at crossover locations 120 between different ones of carbon nanotubes 118. Network 116 includes a sufficient amount of carbon nanotubes 118 to provide a sufficient number of crossover locations 120 such that a suitable entanglement of carbon nanotubes 118 is achieved to form a stable network 116.

As one example, at least some of carbon nanotubes 118 forming network 116 may have varying ranges of lengths. As one example, first ones of carbon nanotubes 118 (identified as first carbon nanotubes 118a in FIG. 5) may have a different length or range of lengths than second ones of carbon nanotubes 118 (identified as second carbon nanotubes 118b in FIG. 5). As one example, first (e.g., long) carbon nanotubes 118a may have a length ranging from approximately 1 millimeter to approximately 4 millimeters and second (e.g., short) carbon nanotubes 118b may have a length ranging from approximately 0.5 millimeters to approximately 1 millimeter.

Thus, and as best illustrated in FIG. 5, the use of both first carbon nanotubes 118a (e.g., long carbon nanotubes) and second carbon nanotubes 118b (e.g., short carbon nanotubes) may be used in forming a stable network 116 of entangles carbon nanotubes 118. For example, the use of long carbon nanotubes 118a may increase the stability of network 116 by providing a sufficient number of crossover locations 120 for short carbon nanotubes 118b (e.g., sufficient entanglement of carbon nanotubes 118).

Referring to FIGS. 6 and 7, and with reference to FIG. 1, as one example, carbon nanotube sheet material 108 also includes thermoplastic filaments 122 (e.g., a plurality of thermoplastic filaments). Thermoplastic filaments 122 enhance the connection (e.g., entanglement) of carbon nanotubes 118. Thermoplastic filaments 122 forming carbon nanotube sheet material 108 may be discontinuous. As one example, thermoplastic filaments 122 may have a diameter of approximately 18,000 nanometers. As one example, thermoplastic filaments 122 may have a length of approximately 6 millimeters.

As one example, as illustrated in FIGS. 6 and 7, carbon nanotubes 118 and thermoplastic filaments 122 are entangled together to form network 116 (e.g., network 116 includes or is formed of entangled carbon nanotubes 118 and thermoplastic filaments 122) forming carbon nanotube sheet material 108. Entanglement between carbon nanotubes 118 occurs at crossover locations 120 between different ones of carbon nanotubes 118. As one example, carbon nanotubes 118 may include both long carbon nanotubes (e.g., first carbon nanotubes 118a) and short carbon nanotubes (e.g., second carbon nanotubes 118b), as illustrated in FIG. 5. Entanglement between carbon nanotubes 118 and thermoplastic filaments 122 occurs at crossover locations 124 between different ones of carbon nanotubes 118. Network 116 includes a sufficient amount of carbon nanotubes 118 and thermoplastic filaments 122 to provide a sufficient number of crossover locations 120 and 124 such that a suitable entanglement of carbon nanotubes 118, and carbon nanotubes 118 and thermoplastic filaments 122, is achieved to form a stable network 116 (e.g., a non-woven carbon nanotube sheet material).

As illustrated in FIGS. 5-7, carbon nanotubes 118 and/or the thermoplastic filaments 122 may be randomly oriented to form network 116 in carbon nanotube sheet material 108. However, alignment of carbon nanotubes 118 and/or the thermoplastic filaments 122 is also contemplated.

Referring to FIG. 4, as one example, carbon nanotube sheet material 108 is wrapped around insulator layer 104 to form shielding layer 106. As one example, carbon nanotube sheet material 108 is spiral wrapped (e.g., wound) around insulator layer 104 to form shielding layer 106. In one example implementation, carbon nanotube sheet material 108 may be made (e.g., cut) into strips 128 of carbon nanotube sheet material 108 (e.g., carbon nanotube tape). One or more of strips 128 of carbon nanotube sheet material 108 may be wrapped (e.g., spiral wrapped) around insulator layer 104 to form shielding layer 106. Strips 128 of carbon nanotube sheet material 108 may have various dimensions suitable to wrap strips 128 around insulator layer 104 to form shielding layer 106. As one specific, non-limiting example, strips 128 may have a width of approximately 0.5 inch (12.7 millimeters). However, other widths are also contemplated, without limitation, for example, based on a particular application.

Figure 8:
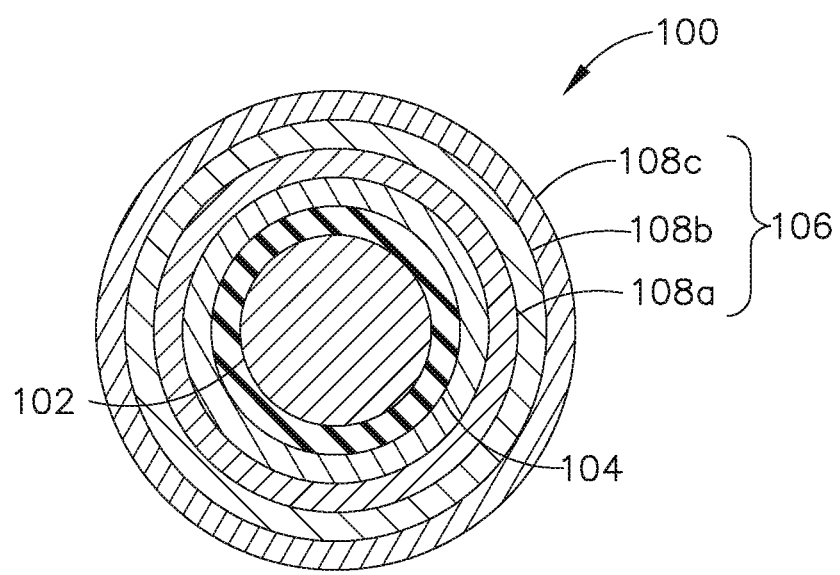
FIG. 8 is a schematic, cross-sectional view of one example of the cable of FIG. 1.

Referring to FIG. 8, and with reference to FIG. 1, as one example, shielding layer 106 includes multiple layers of carbon nanotube sheet material 108 disposed (e.g., wrapped) around insulator layer 104. FIG. 8 illustrates three layers (identified individually as first layer 108a, second layer 108b and third layer 108c) of carbon nanotube sheet material 108 forming shielding layer 106. However, fewer layers (e.g., two layers) or more layers (e.g., four or more layers) of carbon nanotube sheet material 108 are also contemplated without limitation. As one example, each layer (e.g., first layer 108a, second layer 108b and/or third layer 108c) of carbon nanotube sheet material 108 may be formed by wrapping (e.g., spiral wrapping) carbon nanotube sheet material 108 (e.g., strips 128 of carbon nanotube sheet material 108) around insulator layer 104 and/or a preceding layer of carbon nanotube sheet material 108. For instance, multiple layers of carbon nanotube sheet material 108 may improve the shielding effectiveness of shielding layer 106. For example, additional layers of carbon nanotube sheet material 108 may increase the attenuation (in dB) of shielding layer 106.

As one example, a chemical process may be used to grow carbon nanotubes 118 (e.g., long carbon nanotubes 118a and short carbon nanotubes 118b) on a stainless steel sheet. The grown carbon nanotubes 118 are then scraped away from the sheet and added into water. Optionally, at this stage, thermoplastic filaments 122 may also be added to water. The mixture of carbon nanotubes 118 (or carbon nanotubes 118 and thermoplastic filaments 122) and water may then be mixed.

In one example implementation of a process for making carbon nanotube sheet material 108, network 116 (e.g., of carbon nanotubes 118 or carbon nanotubes 118 and thermoplastic filaments 122) may be formed by pouring the mixture of carbon nanotubes 118 (or carbon nanotubes 118 and thermoplastic filaments 122) and water over carrier material 138 (FIG. 1). As examples, carrier material 138 may be a cloth, a fabric, a veil (e.g., a carbon fiber veil), a woven mat (e.g., a woven mat of polyethylene terephthalate ("PET") or a woven mat of metalized PET) or the like. Carrier material 138 may be coupled (e.g., laid on and attached) to a release film (not explicitly illustrated). As one example, the release film may be made of a polytetrafluoroethylene glass material, such as an ARMALON™ polytetrafluoroethylene glass laminate available from Hi-Performance Products, Inc., of San Clemente, Calif.

As the solution is poured over carrier material 138 (and release film), carrier material 138 sifts out and holds carbon nanotubes 118 (or carbon nanotubes 118 and thermoplastic filaments 122) to form network 116 on a surface of carrier material 138. Carrier material 138 and network 116 may then be passed through heating rollers to compress and bind network 116 into a stable layer of entangled carbon nanotubes 118 (or carbon nanotubes 118 and thermoplastic filaments 122). The release film may then be removed from the compressed network 116 of carbon nanotubes 118 (or carbon nanotubes 118 and thermoplastic filaments 122) and carrier material 138 to form carbon nanotube sheet material 108.

The ratio, for example, by weight, of carbon nanotubes 118 and/or thermoplastic filaments 122 may vary depending upon the application of cable 100. As one example, network 116 of carbon nanotubes 118 (or carbon nanotubes 118 and thermoplastic filaments 122) may be up to approximately ten percent by weight of carbon nanotube sheet material 108. As one example, network 116 of carbon nanotubes 118 (or carbon nanotubes 118 and thermoplastic filaments 122) may be up to approximately twenty-five percent by weight of carbon nanotube sheet material 108. As one example, network 116 of carbon nanotubes 118 (or carbon nanotubes 118 and thermoplastic filaments 122) may be up to approximately fifty percent by weight of carbon nanotube sheet material 108. As one example, network 116 of carbon nanotubes 118 (or carbon nanotubes 118 and thermoplastic filaments 122) may be more than approximately fifty percent by weight of carbon nanotube sheet material 108.

In another example implementation of a process for making carbon nanotube sheet material 108, carbon nanotube fibers (e.g., carbon nanotubes 118) may be formed (e.g., aligned, twisted, bundled, etc.) into a thread, yarn or ribbon of carbon nanotube fibers (e.g., carbon nanotube thread, carbon nanotube yarn, or carbon nanotube ribbon). The carbon nanotube thread, yarn or ribbon may be woven together or otherwise combined to form carbon nanotube sheet material 108 (e.g., a woven carbon nanotube sheet material). Optionally, the carbon nanotube fibers may be impregnated into a matrix material to create a pre-impregnated product. Impregnation may be modified with inclusions to enhance thermal and/or electrical properties of the carbon nanotube fibers or the carbon nanotube thread, yarn or ribbon formed from the carbon nanotube fibers. As one non-limiting example, use of metalized fibers may alter electrical and thermal properties while inserting, for example, bromine molecules would alter fiber spacing affecting thermal and electrical properties, or inserting, for example, copper-based nanoparticles may improve thermal conductivity.

Figure 9:
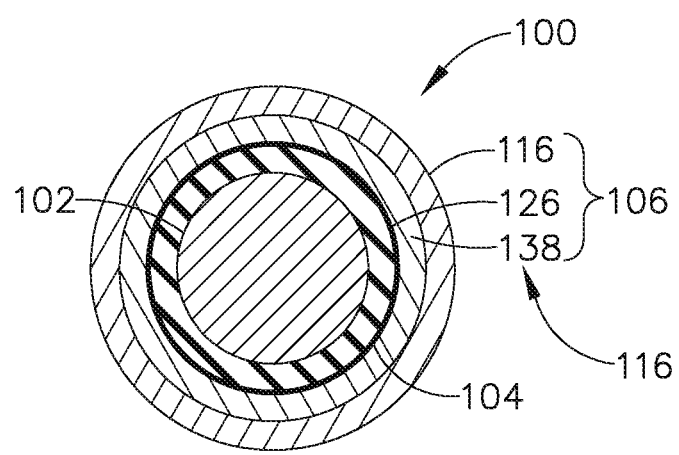
FIG. 9 is a schematic, cross-sectional view of one example of the cable of FIG. 1.

Referring to FIG. 9, and with reference to FIG. 1, as one example, shielding layer 106 also includes nickel coating 126. Nickel coating 126 may be applied to carrier material 138. That is, carrier material 138 may be coated with nickel. Nickel coating 126 may be applied to one or both major surfaces of carrier material 138 to form each layer of carbon nanotube sheet material 108 of shielding layer 106. As one example, nickel may be applied to carrier material 138 by electroless nickel plating or electroplating. As one example, nickel may be applied to carrier material 138 using chemical vapor deposition ("CVD") of nickel on a continuous roll of carrier material 138 that is fed through a reactor. This allows for a very small and controlled amount of nickel to be applied to carrier material 138 and produces the nickel coated carrier material 138 or nickel coated carbon nanotube sheet material 108.

Nickel coating 126 may serve as an effective shield against electromagnetic interference at low frequencies. Low frequencies include frequencies between 0 Hz and 100 MHz.

As one example, and as illustrated in FIG. 9, nickel coating 126 applied to carrier material 138 of carbon nanotube sheet material 108 forming shielding layer 106 may be disposed between insulator layer 104 and carbon nanotube sheet material 108 of shielding layer 106. As one example (not explicitly illustrated), nickel coating 126 of shielding layer 106 may be disposed on an exterior of carbon nanotube sheet material 108 of shielding layer 106.

While not explicitly illustrated in the example of FIG. 9, as one example, cable 100 may also include protective layer 112 (FIG. 3) that surrounds shielding layer 106 (e.g., coaxially covers or encloses conductor core 102, insulator layer 104 and shielding layer 106).

Figure 10:
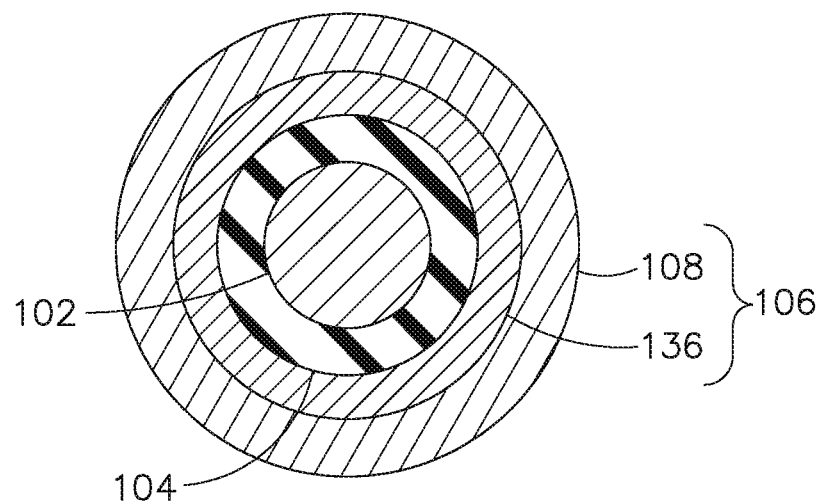
FIG. 10 is

Referring to FIG. 10, as one example, shielding layer 106 of cable 100 may also include metal shielding 136. As one example, metal shielding 136 may be a braided metal shielding of copper, silver or a combination thereof. Metal shielding 136 may surround insulator layer 104 (e.g., coaxially covers or encloses conductor core 102 and insulator layer 104). Carbon nanotube sheet material 108 may surround metal shielding 136 (e.g., coaxially covers or encloses conductor core 102, insulator layer 104 and metal shielding 136). While not explicitly illustrated in the example of FIG. 10, as one example, cable 100 may also include protective layer 112 (FIG. 3) that surrounds shielding layer 106 (e.g., coaxially covers or encloses conductor core 102, insulator layer 104, metal shielding 136 and carbon nanotube sheet material 108).

Advantageously, the shielding effectiveness of carbon nanotube sheet material 108 as shielding layer 106 of cable 100 meets or exceeds the shielding effectiveness of single or double braided silver/copper shielding, particularly at higher frequencies, with a significant weight savings.

Figure 11:
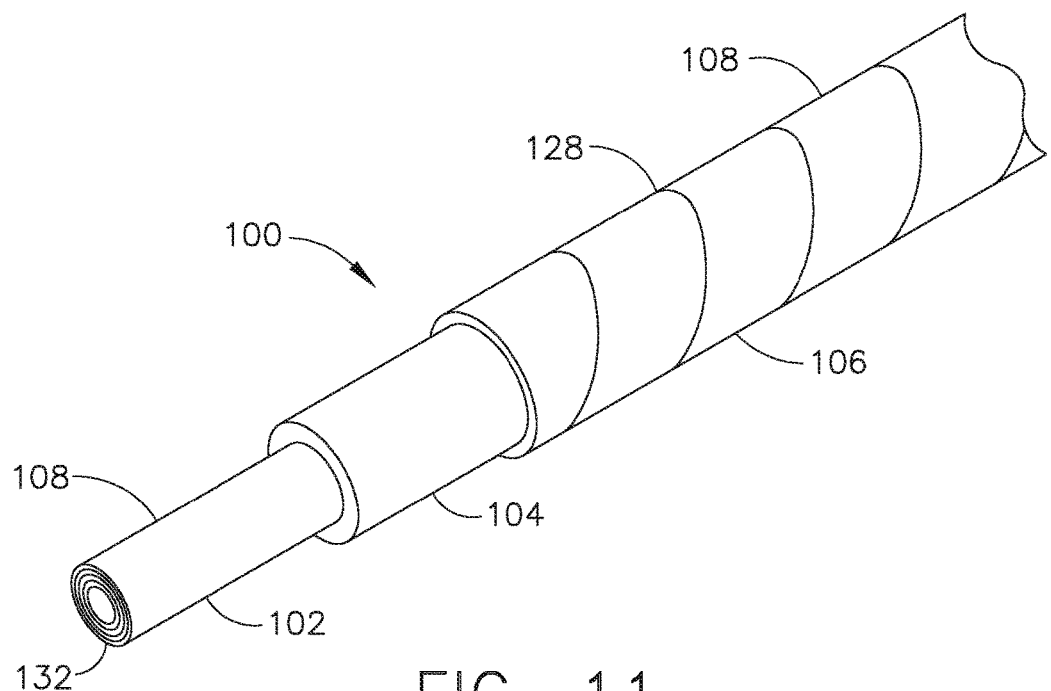
FIG. 11 is a schematic, cutaway view of one example of the cable of FIG. 1.

Referring to FIG. 11, and with reference to FIG. 1, as one example, conductor core 102 includes carbon nanotube sheet material 108 rolled or otherwise formed into roll 132. As described herein above, carbon nanotube sheet material 108 includes carbon nanotubes 118 (or carbon nanotubes 118 and thermoplastic filaments 122) entangled together to form network 116. Carbon nanotube sheet material 108 may be rolled (e.g., tightly rolled) into roll 132 (e.g., a single roll) of carbon nanotube sheet material 108 to form conductor core 102.

Figure 12:
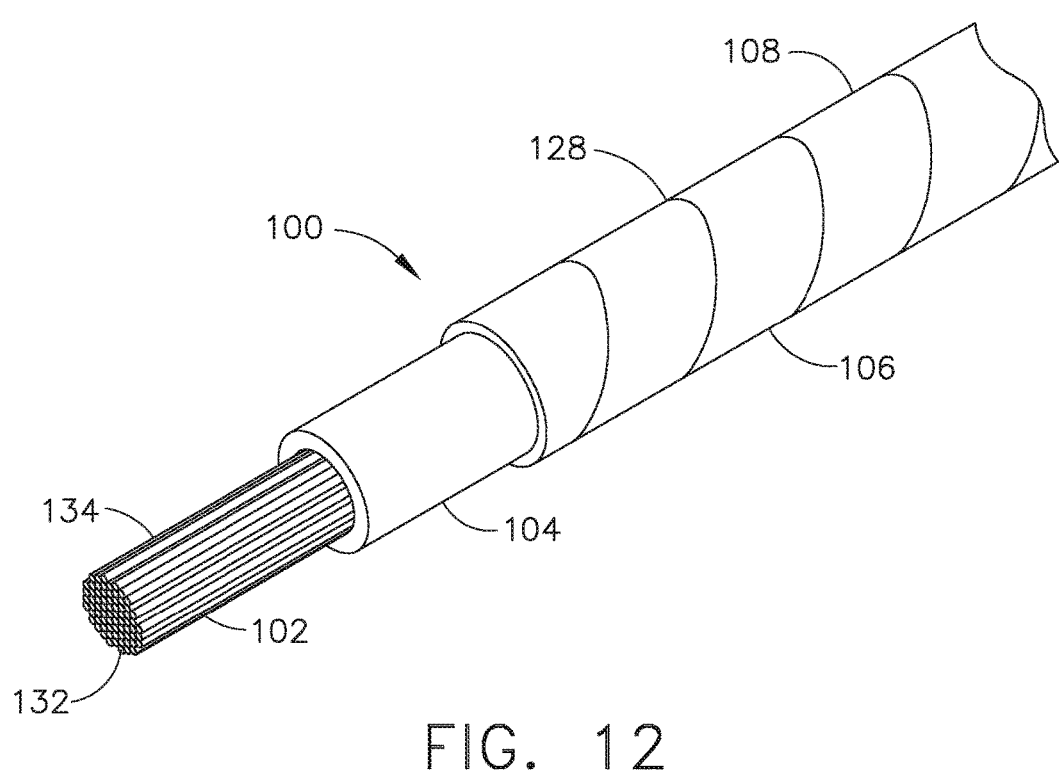
FIG. 12 is a schematic, cutaway view of one example of the cable of FIG. 1.

Referring to FIG. 12, and with reference to FIG. 1, as one example, conductor core 102 includes a plurality of rolls 132 of carbon nanotube sheet material 108. Rolls 132 of carbon nanotubes sheet material 108 may be bundled together into bundle 134 of rolls 132 of carbon nanotubes sheet material 108 to form conductor core 102.

In another example (not explicitly illustrated), conductor core 102 may include both rolls 132 of carbon nanotube sheet material 108 and stands of metal wire. For instance, rolls 132 of carbon nanotube sheet material 108 and stands of metal wire may be wound, wrapped, braided, or otherwise bundled together to form conductor core 102.

Carbon nanotubes 118 are good electrical conductors and also have excellent mechanical properties with ultra high elastic moduli. Thus, the examples illustrated in FIGS. 11 and 12 use carbon nanotube sheet material 108 (either in the form of roll 132 of carbon nanotube sheet material 108 or bundle 134 of rolls 132 of carbon nanotube sheet material 108) to form conductor core 102. Carbon nanotube sheet material 108 may be cut, trimmed, or otherwise shaped to have desired dimensions (e.g., widths and lengths) and/or shapes (e.g., strips) suitable to be formed into roll 132. As one specific, non-limiting example, carbon nanotube sheet material 108 used to form roll 132 may have a width of approximately 0.5 inch. However, other widths are also contemplated, without limitation, for example, depending upon a particular application.

In one implementation, carbon nanotube sheet material 108, for example, made in accordance with the process described above, may have a width of approximately fifteen inches. However, carbon nanotube sheet 108 may be made having various other widths (e.g., less than or more than fifteen inches), without limitation. Further, carbon nanotube sheet material 108, for example, made in accordance with the process described above, may be made having any length. For instance, carbon nanotube sheet material 108 may be made in a continuous flow process and cut to a desired length.

Thus, the disclosed cable 100 including carbon nanotube sheet material 108 as shielding layer 106 or as shielding layer 106 and conductor core 102 provides several benefits over traditional braided cable shielding, particularly in the aerospace industry. As one example, carbon nanotube sheet material 108 as shielding layer 106 offers a significantly lighter and more efficient (e.g., shielding effectiveness, volumetric efficiency and the like) cable 100. As another example, carbon nanotube sheet material 108 as shielding layer 106 offers enhanced corrosion resistance, for example, against environmental conditions seen during the lifetime of an aircraft. As another example, carbon nanotube sheet material 108 as shielding layer 106 improves the ability of cable 100 to resist the effects of interference from electromagnetic fields generated by HIRF. As another example, carbon nanotube sheet material 108 as shielding layer 106 improves the ability of cable 100 to resist direct and indirect effects of lightning strikes (e.g., improves lightning protection).

Referring to FIG. 13, and with reference to FIGS. 1-12, one example of disclosed method, generally designated 200, for making cable 100, is disclosed. Modifications, additions, or omissions may be made to method 200 without departing from the scope of the present disclosure. Method 200 may include more, fewer, or other steps. Additionally, steps may be performed in any suitable order.

Referring to FIG. 13, and with reference to FIGS. 1, 2 and 4, in one example implementation, method 200 includes the step of providing conductor core 102, as shown at block 202. Method 200 also includes the step of placing insulator layer 104 to surround conductor core 102, as shown at block 204. Method 200 also includes the step of placing shielding layer 106 to surround insulator layer 104, as shown at block 206. As one example, shielding layer 106 includes carbon nanotube sheet material 108.

Referring to FIG. 13, and with reference to FIGS. 1 and 3, in one example implementation, method 200 also includes the step of placing protective layer 112 to surround shielding layer, as shown at block 208.

Referring to FIG. 13, and with reference to FIGS. 1, 2 and 4, in one example implementation, the step of placing shielding layer 106 to surround insulator layer 104 (block 206) includes the step of wrapping carbon nanotube sheet material 108 around insulator layer 104, as shown at block 210.

Referring to FIG. 13, and with reference to FIGS. 1, 2 and 4, in one example implementation, the step of wrapping carbon nanotube sheet material 108 around insulator layer 104 (block 210) includes the step of spiral winding strips 128 of carbon nanotube sheet material 108 around insulator layer 104, as shown at block 212.

Referring to FIG. 13, and with reference to FIGS. 4 and 7, in one example implementation, the step of wrapping carbon nanotube sheet material 108 around insulator layer 104 (block 210) also includes the step of forming layers of carbon nanotube sheet material 108 (e.g., strips 128 of carbon nanotube sheet material 108) around insulator layer 104, as shown at block 214.

Referring to FIG. 13, and with reference to FIGS. 1, 2 and 4, in one example implementation, method 200 also includes the step of providing carbon nanotube sheet material 108, as shown at block 216. As one example, carbon nanotube sheet material 108 forms shielding layer 106.

Referring to FIG. 13, and with reference to FIGS. 1, 2, 4, 5 and 7, in one example implementation, the step of providing carbon nanotube sheet material 108 (block 216) includes the step of entangling carbon nanotubes 118 to form network 116, as shown at block 218.

Referring to FIG. 13, and with reference to FIGS. 1, 2, 4, 6 and 7, in one example implementation, the step of providing carbon nanotube sheet material 108 (block 216) includes the step of entangling carbon nanotubes 118 and thermoplastic filaments 122 to form network 116, as shown at block 220.

Referring to FIGS. 1 and 8, as described above, network 116 of carbon nanotubes 118 or carbon nanotubes 118 and thermoplastic filaments 122 may be formed on carrier material 138. In one example, carrier material 138 may include nickel coating 126. Thus, as one example, network 116 of carbon nanotubes 118 (or carbon nanotubes 118 and thermoplastic filaments 122) and carrier material 138 or carrier material 138 and nickel coating 126 form carbon nanotube sheet material 108 of shielding layer 106.

Referring to FIG. 13, and with reference to FIGS. 1 and 11, in one example implementation, the step of providing conductor core 102 (block 202) includes the step of forming carbon nanotube sheet material 108 into roll 132, as shown at block 224. Roll 132 of carbon nanotube sheet material 108 forms conductor core 102.

Referring to FIG. 13, and with reference to FIGS. 1 and 12, in one example implementation, the step of providing conductor core 102 (block 202) includes the step of forming bundle 134 of rolls 132 of carbon nanotube sheet material 108, as shown at block 226. Bundle 134 of rolls 132 of carbon nanotube sheet material 108 forms conductor core 102.

Examples of the present disclosure may be described in the context of aircraft manufacturing and service method 1100 as shown in FIG. 14 and aircraft 1200 as shown in FIG. 15.

During pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of aircraft 1200 may take place. Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 15, aircraft 1200 produced by illustrative method 1100 may include airframe 1202 with a plurality of high-level systems 1204 and interior 1206. Examples of high-level systems 1204 include one or more of propulsion system 1208, electrical system 1210, hydraulic system 1212 and environmental system 1214. Any number of other systems may be included. Although an aerospace example is shown, the principles disclosed herein may be applied to other industries, such as the automotive industry, the marine industry, the construction industry or the like.

The apparatus (cable 100) (FIG. 1) and methods (method 500) (FIG. 13) shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatus, systems and methods, or combination thereof may be utilized during production stages (blocks 1108 and 1110). Similarly, one or more examples of the apparatus and methods, or a combination thereof, may be utilized, for example and without limitation, while aircraft 1200 is in service (block 1112) and during maintenance and service stage (block 1114).

Although various examples of the disclosed transmission cable and methods for making the same have been shown and described, modifications may occur to those skilled in the art upon reading the specification. The present application includes such modifications and is limited only by the scope of the claims.

What is claimed is:

1. A cable comprising:
a conductor core;
an insulator layer surrounding said conductor core; and
a shielding layer surrounding said insulator layer, wherein said shielding layer comprises a carbon nanotube sheet material comprising:
a permeable carrier material formed from one of a woven fabric and a nonwoven fabric, said carrier material comprising a first surface and a second surface; and
discontinuous carbon nanotubes that are entangled together to form a nonwoven network, wherein said nonwoven network of said discontinuous carbon nanotubes is compressably coupled to said first surface of said carrier material; and
a metallic coating that is applied to said second surface of said carrier material.

2. The cable of claim 1 wherein said carbon nanotubes comprise a diameter ranging from approximately 1 nanometer to approximately 50 nanometers and a length ranging from approximately 0.5 millimeters to approximately 4 millimeters.

3. The cable of claim 1 wherein said carbon nanotube sheet material comprises first ones of said carbon nanotubes comprising a first length ranging from approximately 0.5 millimeters to approximately 1 millimeter and second ones of said carbon nanotubes comprising a second length ranging from approximately 1 millimeter to approximately 4 millimeters.

4. The cable of claim 1 wherein said carbon nanotube sheet material further comprises discontinuous thermoplastic filaments entangled together and entangled with said carbon nanotubes to form said nonwoven network coupled to said carrier material.

5. The cable of claim 4 wherein said thermoplastic filaments comprise a diameter of approximately 18,000 nanometers and a length of approximately 6 millimeters.

6. The cable of claim 1 wherein said carbon nanotube sheet material is wrapped around said insulator layer.

7. The cable of claim 1 wherein said shielding layer further comprises a plurality of strips of said carbon nanotube sheet material spiral wound around said insulator layer.

8. The cable of claim 1 wherein said conductor core comprises a roll of said carbon nanotube sheet material.

9. The cable of claim 8 wherein said carbon nanotube sheet material further comprises discontinuous thermoplastic filaments entangled together and entangled with said carbon nanotubes to form said nonwoven network coupled to said carrier material.

10. The cable of claim 1 wherein said conductor core comprises a bundle of rolls of said carbon nanotube sheet material.

11. The cable of claim 1 wherein said carrier material comprises a nonwoven carbon fiber veil.

12. The cable of claim 1 wherein said carrier material comprises a woven polyethylene terephthalate mat.

13. The cable of claim 1 wherein said metallic coating applied to said second surface of said carrier material is in contact with said insulator layer.

14. The cable of claim 1 wherein:
said nonwoven network of said discontinuous carbon nanotubes is compressably coupled to said first surface of said carrier material using heated rollers; and
said metallic coating is applied to said second surface of said carrier material using at least one of electroless plating, electroplating, and chemical vapor deposition.

15. A cable comprising:
a conductor core, wherein said conductor core comprises a carbon nanotube sheet material;
an insulator layer surrounding said conductor core; and
a shielding layer surrounding said insulator layer, wherein said shielding layer comprises said carbon nanotube sheet material; and
wherein said carbon nanotube sheet material comprises:
a permeable carrier material formed from one of a woven fabric and a nonwoven fabric, said carrier material comprising a first surface and a second surface, opposite said first surface;
discontinuous carbon nanotubes that are entangled together to form a nonwoven network, wherein said nonwoven network of said discontinuous carbon nanotubes is compressably coupled to said first surface of said carrier material and shields against electromagnetic interference at frequencies greater than approximately one hundred megahertz; and
a metallic coating that is applied to said second surface of said carrier material, wherein said metallic coating shields against said electromagnetic interference at frequencies between approximately zero hertz and one hundred megahertz.

16. The cable of claim 15 wherein said conductor core further comprises at least one roll of said carbon nanotube sheet material.

17. The cable of claim 15 wherein said carrier material comprises one of a nonwoven carbon fiber veil or a woven polyethylene terephthalate mat.

18. A method for making a cable comprising:
placing an insulator layer to surround a conductor core; and
wrapping a carbon nanotube sheet material around said insulator layer to form a shielding layer surrounding said insulator layer and said conductor core, said carbon nanotube sheet material comprising:
a permeable carrier material formed from one of a woven fabric and a nonwoven fabric, said carrier material comprising a first surface and a second surface, opposite said first surface; and
discontinuous carbon nanotubes that are entangled together to form a nonwoven network, wherein said nonwoven network of said discontinuous carbon nanotubes is compressably coupled to first surface of said carrier material; and
a metallic coating that is applied to said second surface of said carrier material.

19. The method of claim 18 wherein said carbon nanotube sheet material further comprises discontinuous thermoplastic filaments entangled together and entangled with said carbon nanotubes to form said nonwoven network coupled to said carrier material.

20. The method of claim 18 further comprising:
forming another carbon nanotube sheet material; and
rolling said another carbon nanotube sheet material into at least one roll to form said conductor core.

* * * * *